US012761823B2

(12) United States Patent
Bellad

(10) Patent No.: US 12,761,823 B2
(45) Date of Patent: Oct. 13, 2026

(54) POWER AWARE MEMORY ALLOCATION AND FREEING

(71) Applicant: Cypress Semiconductor Corporation, San Jose, CA (US)

(72) Inventor: Mahantesh Virupaxappa Bellad, Bangalore (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 0 days.

(21) Appl. No.: 18/478,425

(22) Filed: Sep. 29, 2023

(65) Prior Publication Data

US 2025/0110653 A1 Apr. 3, 2025

(51) Int. Cl.
*G06F 3/06* (2006.01)

(52) U.S. Cl.
CPC ............ *G06F 3/064* (2013.01); *G06F 3/0626* (2013.01); *G06F 3/0679* (2013.01)

(58) Field of Classification Search
CPC ....... G06F 3/064; G06F 3/0626; G06F 3/0679
See application file for complete search history.

(56) References Cited

U.S. PATENT DOCUMENTS

| | | | | |
|---|---|---|---|---|
| 2008/0147915 | A1* | 6/2008 | Kleymenov | G06F 9/5016 710/52 |
| 2022/0291962 | A1* | 9/2022 | Cherches | G06F 12/0246 |
| 2023/0161652 | A1* | 5/2023 | Soule | G06F 9/5044 719/328 |
| 2023/0273727 | A1* | 8/2023 | Zhou | G06F 3/061 711/154 |

* cited by examiner

*Primary Examiner* — Masud K Khan

(57) ABSTRACT

A method of memory allocation is disclosed. An allocation size of memory to allocate is determined. A first memory block is searched for based on the allocation size, where the first memory block is a free memory block. When the first memory block is not found, a first macro block in a memory device is searched for, where the first macro block is an available macro block. When the first macro block is found, the first macro block is powered on, and the first macro block is marked as occupied.

14 Claims, 7 Drawing Sheets

400

POWER AWARE MEMORY ALLOCATION AND FREEING

TECHNICAL FIELD

This disclosure generally relates to embedded systems, and more specifically, to memory allocation and freeing in an embedded system.

BACKGROUND

In modern days, embedded systems and devices are generally powered by one or more batteries. Therefore, power management is a key to achieve long battery life as it can help reduce operation cost and carbon footprint, and increase the life of a product.

In an embedded system or device, a random access memory (RAM) is one of the crucial components, though it also consumes significant power when it is in active and retention modes. With current solutions, when a memory allocation occurs, the requested chunk of memory is allocated from a heap of the memory. For instance, referring to FIG. 1, macro blocks of the RAM (e.g., block N, . . . , block N+7) are powered on once the embedded system boots (as indicated in initial power state 101). As can be seen, in initial state 101, only blocks N+2 and N+3 are occupied (as indicated by the heap start position and the current heap position) although all the RAM macro blocks are turned on. After memory is allocated (state 102), only blocks N+2 to N+6 are occupied, but again, all the RAM macro blocks continue to remain powered on. Even after the allocated memory is freed (state 103), those macro blocks remain powered on as long as the system or device is in active power mode or remains in retention state when the system enters deep sleep (DS) or DS-RAM power mode.

Unfortunately, in the aforementioned scenarios, unused blocks would continue to consume power in active mode as well as in DS and DS-RAM power modes, thereby decreasing the life of the battery.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

According to one aspect, a method of memory allocation is provided. In an embodiment, an allocation size of memory to allocate may be determined. A first memory block may be searched for based on the allocation size, where the first memory block is a free memory block. When the first memory block is not found, a first macro block in a memory device may be searched for, where the first macro block is an available macro block. When the first macro block is found, the first macro block may be powered on, and the first macro block may be marked as occupied.

According to another aspect, a method of memory freeing is provided. In an embodiment, it is determined whether a macro block of a memory device can be freed. In response to determining that the macro block can be freed, the macro block may be powered off, a macro block record may be updated to indicate that the macro block is unoccupied, and at least one heap management structure may be updated to indicate a memory block is free, where the memory block was previously allocated in the macro block.

Figure 1:
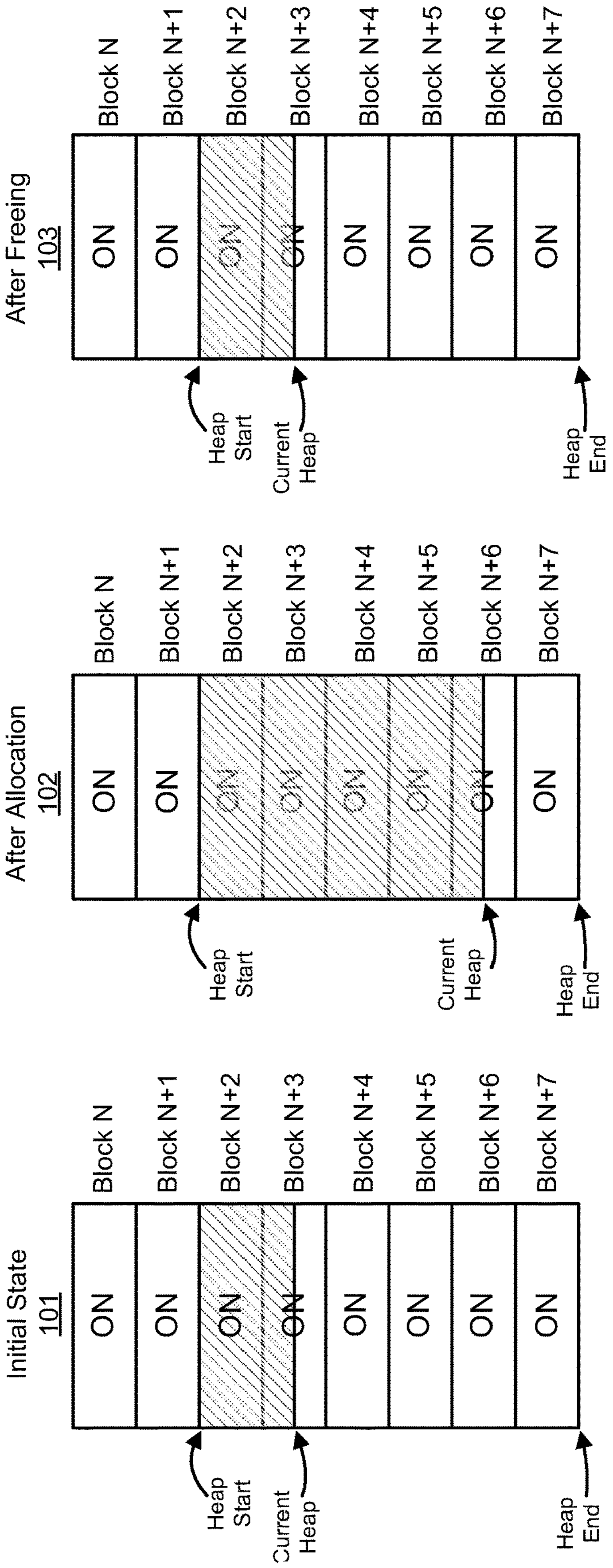
FIG. 1 (Prior Art)
FIG. 1 is a block diagram illustrating a conventional memory allocation and freeing system.
Figure 2:
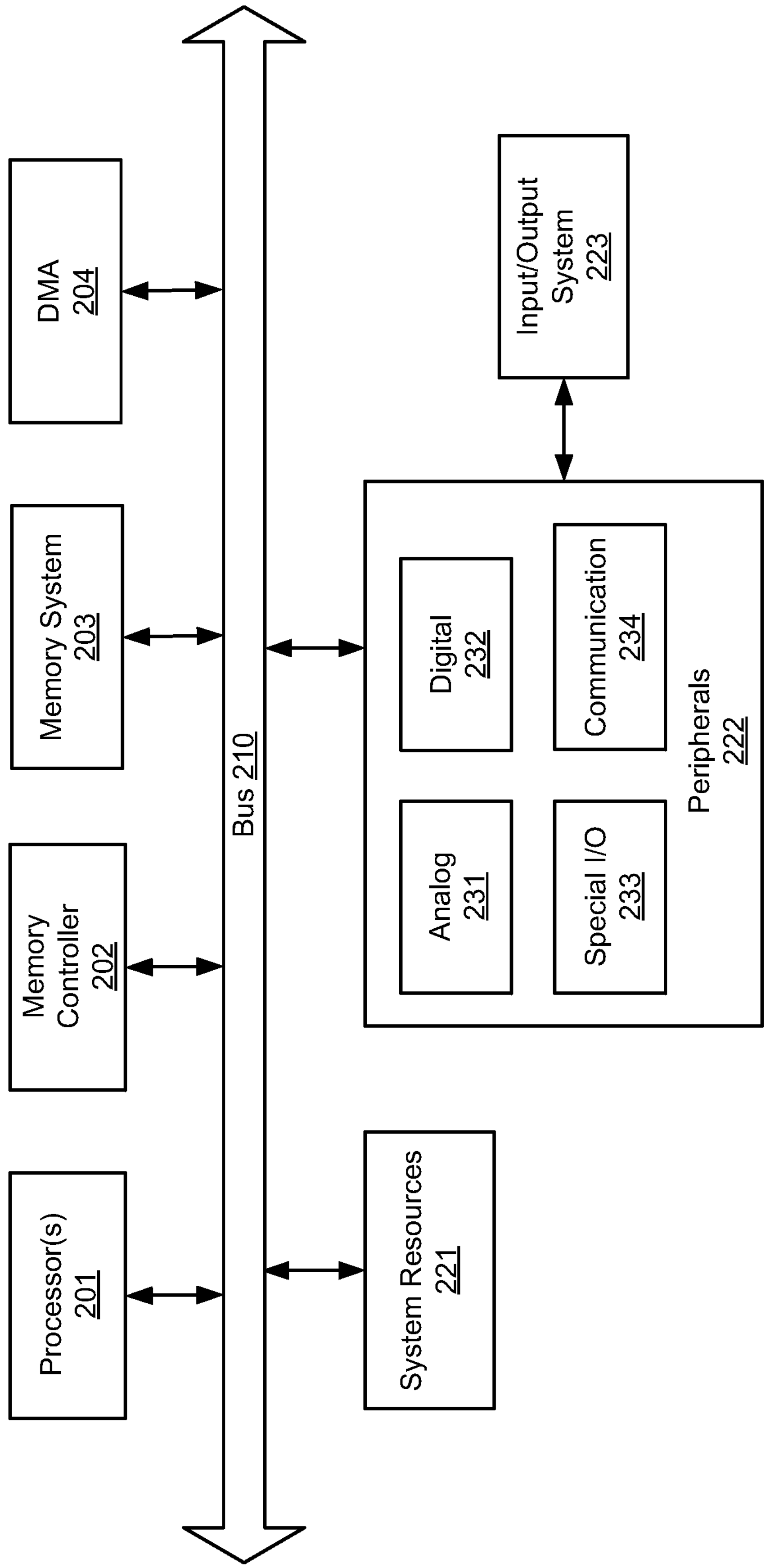
FIG. 2 is a block diagram illustrating an example embedded system or device according to an embodiment.

FIG. 2 is a block diagram illustrating an example embedded system or device according to an embodiment. Note that in FIG. 2, system 200 is intended to show a high level view of the components of an embedded system or device. However, it is to be understood that additional components may be present in certain implementations and furthermore, different arrangement of the components shown may occur in other implementations. System 200 may represent a laptop, a tablet, a mobile phone, a media player, a personal digital assistant (PDA), a Smartwatch, a personal communicator, a gaming device, a network router or hub, a wireless access point (AP) or repeater, a set-top box, etc.

With continued reference to FIG. 2, embedded system or device 200, for example a system on a chip (SoC), may include, but not limited to, one or more processors 201, a memory controller 202, a memory system 203, a direct memory access (DMA) 204, system resources 221, peripherals 222, and input/output (I/O) system 223 connected via a bus or interconnect 210. Bus 210 may include a system bus and a peripheral bus.

Processor(s) 201 may represent a single processor or multiple processors with a single processor core or multiple processor cores included therein. Processor(s) 201 may represent one or more general-purpose processors such as a microprocessor, a central processing unit (CPU), or the like. More particularly, processor(s) 201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor(s) 201 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, an artificial intelligence (AI) processor, or any other type of logic capable of processing instructions.

Processor(s) 201, which may be a low power multi-core processor socket such as an ultra-low voltage processor, may act as a main processing unit and central hub for communication with the various components of the system 200. Such processor can be implemented as a SoC. Processor(s) 201 may be configured to execute instructions for performing the operations or processes discussed herein. Processor (s) 201 may include registers to manage data and control the operations of the processor(s) 201. Those registers may include, for example, general purpose registers, special purpose registers, program counter (PC) register, instruction register (IR), accumulator (AC) register, memory address register (MAR), data register (DR), input register, output register, etc.

Processor(s) 201 may communicate with memory system 203, which in an embodiment can include multiple memory devices to provide for a given amount of system memory. For example, memory system 203 may include one or more volatile storage (or memory) devices such as random access memory (RAM), dynamic RAM (DRAM), synchronous DRAM (SDRAM), static RAM (SRAM), or other types of storage devices. The volatile memory devices may store information including sequences of instructions that are executed by processor(s) 201, or any other device. For example, executable code and/or data of a variety of operating systems (e.g., Mac OS®/iOS® from Apple, Android® from Google®, LINUX, UNIX, or other real-time or embedded operating systems), device drivers, firmware (e.g., input output basic system or BIOS), and/or applications can be loaded into the volatile memory devices and executed by processor(s) 201. In an embodiment, memory system 203 may also include non-volatile storage or memory devices, such as flash memory, read-only memory (ROM), programmable ROM, electrically erasable programmable read-only memory (EEPROM), etc. The non-volatile memory devices generally serve as secondary or long-term persistent storages. For example, a flash memory may be used to store data and/or program code while a ROM may be used to store boot code of the system 200.

In some embodiments, memory controller 202 manages data flow to and from the memory system 203. The memory controller 202 may communicate with processor(s) 201 and other devices (e.g., hard drive or graphics card), to ensure that the appropriate data is available to processor(s) 201 when needed. For example, the memory controller 202 may receive requests for data from the processor(s) 201 and other devices, and retrieve the requested data from memory system 203. In an embodiment, memory controller 202 may include configuration registers into which memory configuration information is loaded and is operable to output memory requests in response to receiving memory access requests from a high-speed interface (e.g., DMA 204) and in accordance with the memory configuration information loaded in the registers. Memory controller 202 may further include memory power registers for power control of individual memory sections or macro blocks (e.g., RAM sections) of a memory device (e.g., RAM). For example, using the memory power registers, the power state of each memory section or macro block of the memory device can be controlled to power on or off independently while system or device 200 is in active power mode or remains in retention state. In some embodiments, the memory controller is integrated into processor(s) 201 and works in close coordination with other components of the memory management system, such as a memory bus and memory cache, to ensure that the processor(s) 201 can quickly and efficiently access data.

Still referring to FIG. 2, DMA 204 serves to transfer data from one memory location to another without the direct involvement of processor(s) 201. Thus, DMA 203 may be used to improve data access performance by freeing processor(s) 201 from data-related tasks and hence improves the overall data throughput of system 200.

In an embodiment, system resources 221 is a controller that handles various components, such as the clocking subsystem, power and operational modes, power supply and monitoring subsystem, watchdog timer, etc. Those components may be connected to each other by a data bus, which can be bus 210 or a separate bus.

As shown in FIG. 2, peripherals 222 may include analog peripherals 231, digital peripherals 232, special I/O system 233, and communication peripherals 234. Analog peripherals 231 may include analog components that provide mixed signal capabilities, such as analog-to-digital converters (ADCs), op-amps (e.g., comparator, amplifier, transimpedance amplifier (TIA), mixer, etc.), current and voltage sources, etc. Analog peripherals 231 may also include programmable analog components that provide analog programmability using, for example, switched capacitors.

Digital peripherals 232 may include digital components, such as counters, pulse width modulator (PWM), timer, digital filters, multiplexers, de-multiplexers, etc. Digital peripherals 232 may also include programmable digital components to build applications with digital capabilities that are not provided by system 200. The programmable digital components, for example, may include programmable logic devices (PLDs), arithmetic logic unit (ALU), etc.

Special I/O system 233 may include inputs and/or outputs designated to perform specialized functions or have specialized features. The inputs and/or outputs can include, for example, capacitive touch detection, liquid crystal display (LCD) and light-emitting diode (LED) drivers, etc. Communication peripherals 234 may include multiple communication interfaces, for example universal serial bus (USB), universal asynchronous receiver-transmitter (UART), I2C, I2S, Ethernet, serial peripheral interface (SPI), controller area network (CAN), Bluetooth, WiFi, cellular, etc. System 200 uses these interfaces to communicate with external devices, such as another embedded system or device (e.g., another SoC), a base station, a server, etc.

In an embodiment, I/O system 223 includes I/O devices that communicate with peripherals 222 to allow a user to interact and control system 200. I/O system 223 may include input devices, such as a keyboard, touch pad, camera, microphone, global positioning system (GPS) and various sensors, and output devices, such as a display screen, headphone, speakers, a printer, etc.

Figure 3:
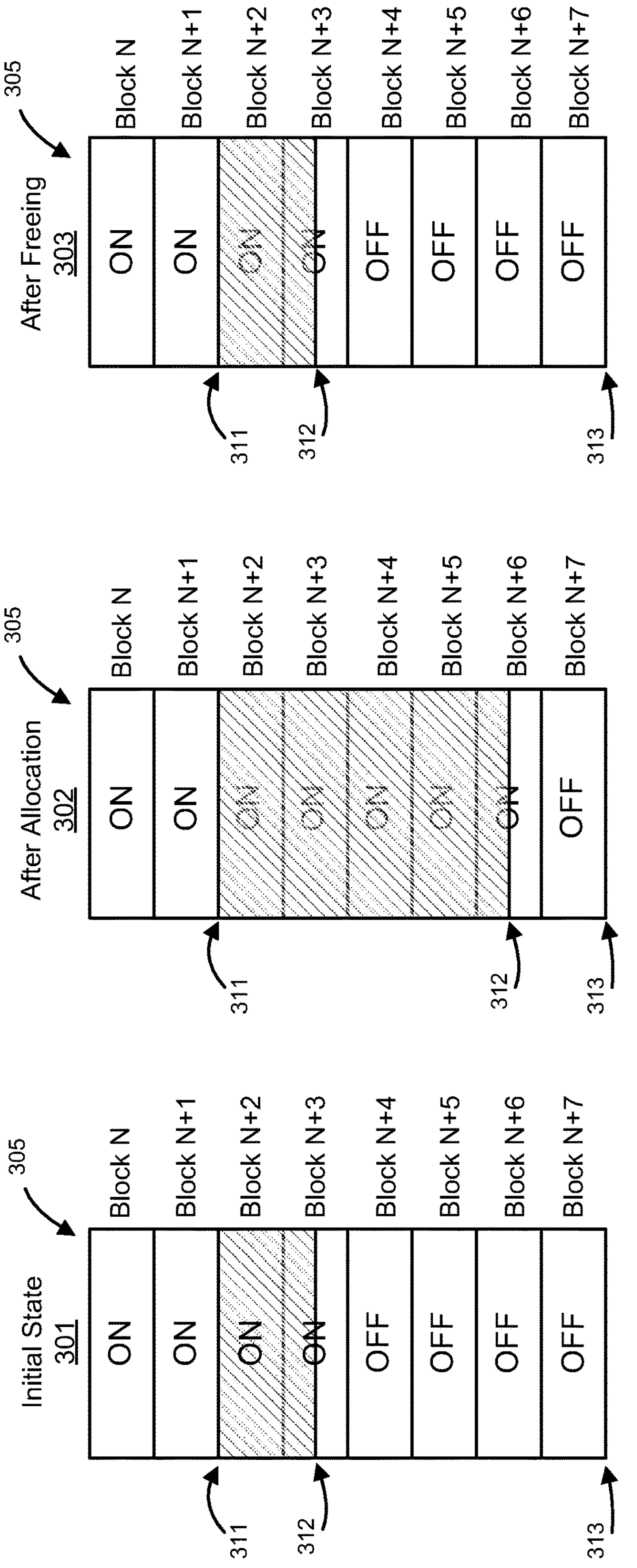
FIG. 3 is a block diagram illustrating a memory allocation and freeing system according to an embodiment.

FIG. 3 is a block diagram illustrating a memory allocation and freeing system according to an embodiment. In some embodiments, memory allocation and freeing system 300 may be implemented in embedded system 200 of FIG. 2. For example, system 300 may be performed by manipulating or setting the values stored in the memory power registers of memory controller 202.

In an embodiment, system 300 may dynamically power on or off macro blocks of a memory device 305 (e.g., RAM) based on the memory requirement for a data structure (e.g., heap) from which the memory device 305 is allocated and freed using memory allocation and freeing functions, such as malloc, calloc, free, realloc, etc. Referring to the example shown in FIG. 3, memory 305 includes memory macro blocks (or memory sections) N to N+7. Note that FIG. 3 merely illustrates an example embodiment and that any number of macro blocks may exist in memory 305.

In initial state 301, macro blocks N to N+3 may be powered on and macro blocks N+4 to N+7 may be powered off, as blocks N+4 to N+7 are not occupied with data (i.e., unused or free), to preserve the life of a power source (e.g., a battery). Macro blocks N+2 and N+3 may be occupied or allocated (e.g., by a memory block containing program code), as indicated by heap start pointer 311 and heap current pointer 312, and therefore, those macro blocks may be turned on to retain the occupied data. Since macro block N+7 is the last block in this example, heap end pointer 313 points to the end of macro block N+7. Although macro blocks N to N+1 are unoccupied or free, they nevertheless may be turned on since they are associated with a memory pool that extends from block N to block N+3.

When memory allocation is performed (allocation state 302), unoccupied macro blocks may be searched and dynamically powered on based on a size of a data structure (e.g., heap) from which memory 305 is allocated. As shown, the allocation size now extends from macro block N+3 to macro block N+6, as indicated by heap current pointer 312 in allocation state 302, and thus, macro blocks N+4 to N+6 may be dynamically turned on to accommodate the allocated region. Macro block N+7 remains powered off, as it is unoccupied, to preserve power.

When memory freeing is performed (freeing state 303), the allocated memory macro blocks may be marked as free and dynamically turned off to preserve power. In the example illustrated in FIG. 3, since blocks N+4 to N+6 were previously turned on to handle the memory allocation, those blocks may be dynamically turned off and marked as free. Heap current pointer 312 may be returned to its previously position pointing to a memory space in block N+3.

Figure 4:
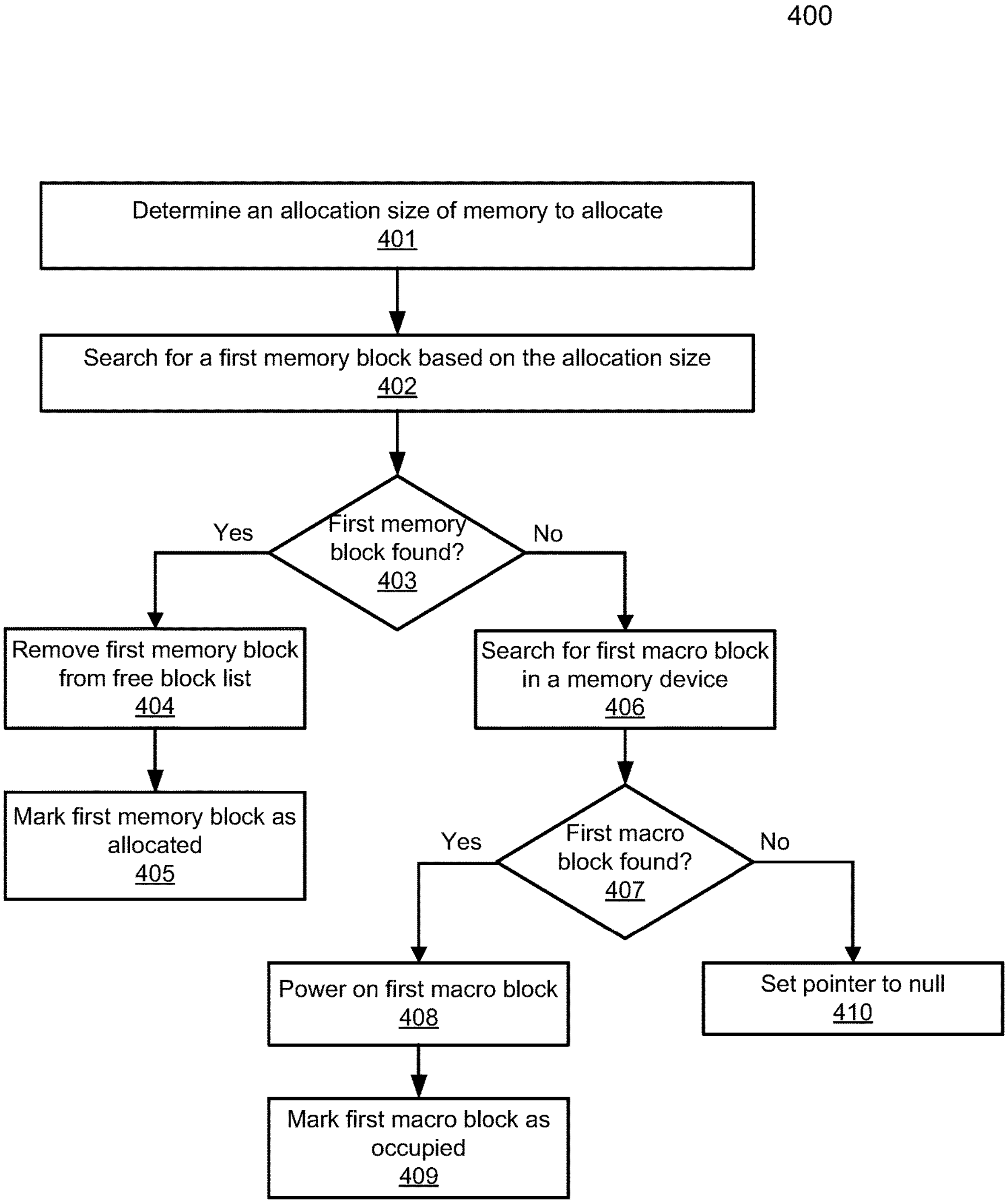
FIG. 4 is a flow diagram illustrating a process for memory allocation according to an embodiment.

FIG. 4 is a flow diagram of a process of memory allocation according to an embodiment. Process 400 may be performed by processing logic which may include software, hardware, or a combination thereof. For example, process 400 may be performed by processor(s) 201 of FIG. 2.

Referring to FIG. 4, at block 401, an allocation size of memory to allocate is determined. At block 402, a first memory block is searched for based on the allocation size, where the first memory block is a free memory block. At block 403, it is determined whether the first memory block is found. If so, process 400 proceeds to block 404. Otherwise, process 400 proceeds to block 406.

At block 404, the first memory block is removed from a free block list. At block 405, the first memory block is marked as allocated. At block 406, a first macro block in a memory device (e.g., RAM) is searched for, where the first macro block is an available or unoccupied macro block. At block 407, it is determined whether the first macro block is found. If so, process 400 proceeds to block 408. Otherwise, process 400 proceeds to block 410 where a pointer is set to null. At block 408, the first macro block is powered on. At block 409, the first macro block is marked as occupied.

Figure 5:
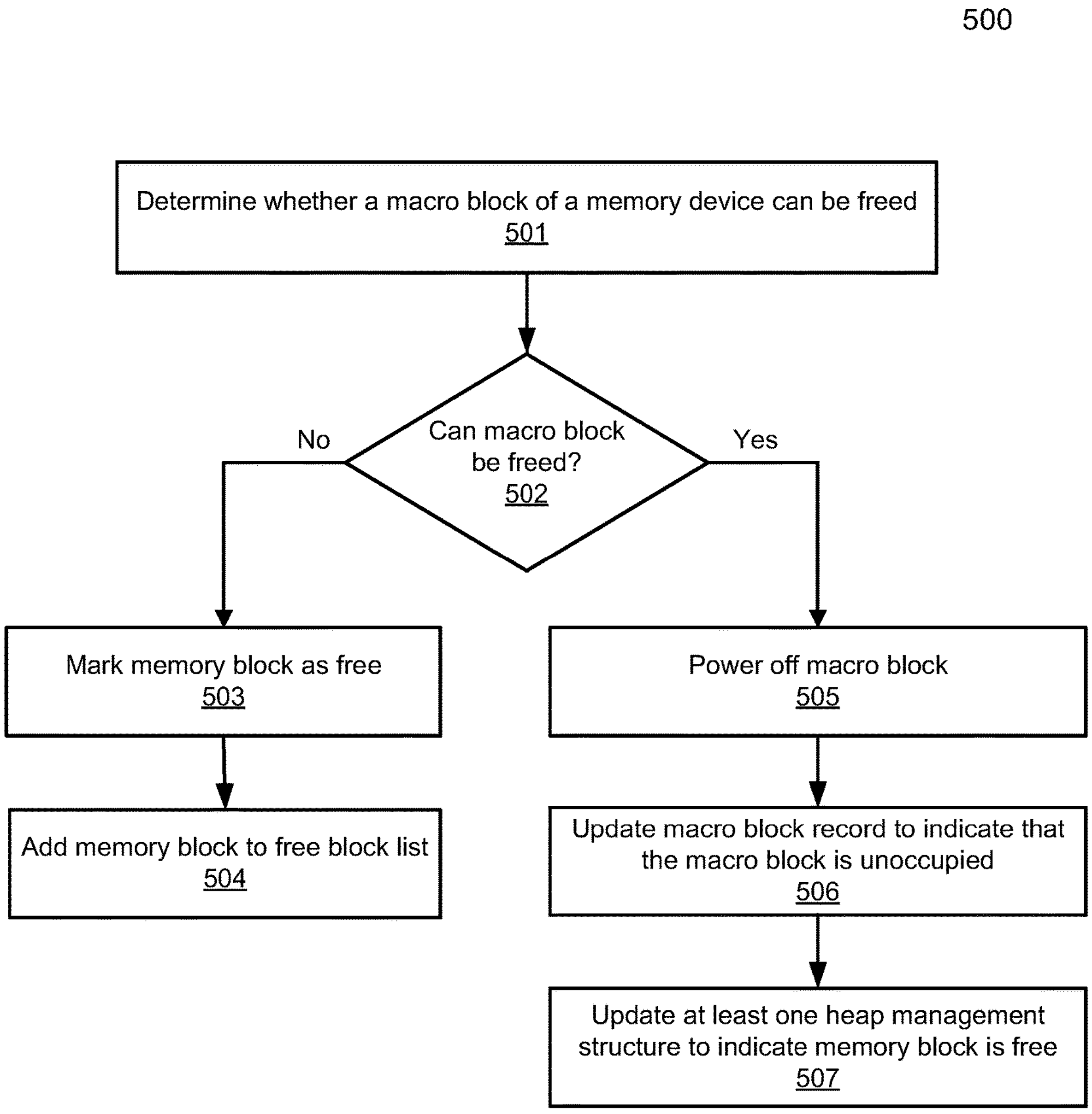
FIG. 5 is a flow diagram illustrating a process for freeing memory according to an embodiment.

FIG. 5 is a flow diagram of a process of memory freeing according to an embodiment. Process 500 may be performed by processing logic which may include software, hardware, or a combination thereof. For example, process 500 may be performed by processor(s) 201 of FIG. 2.

Referring to FIG. 5, at block 501, it is determined whether a macro block of a memory device can be freed. At block 502, if the macro block can be freed, process 500 proceeds to block 505. Otherwise, process 500 proceeds to block 503.

At block 505, the macro block is powered off. At block 506, a macro block record is updated to indicate that the macro block is unoccupied. At block 507, at least one heap management structure is updated to indicate a memory block is free. The memory block, for example, may be previously allocated in the macro block and is designated to be freed.

At block 503, a memory block is marked as free. For example, the memory block may be previously allocated in the macro block and is designated to be freed. At block 504, the memory block is added to the free block list.

Figure 6:
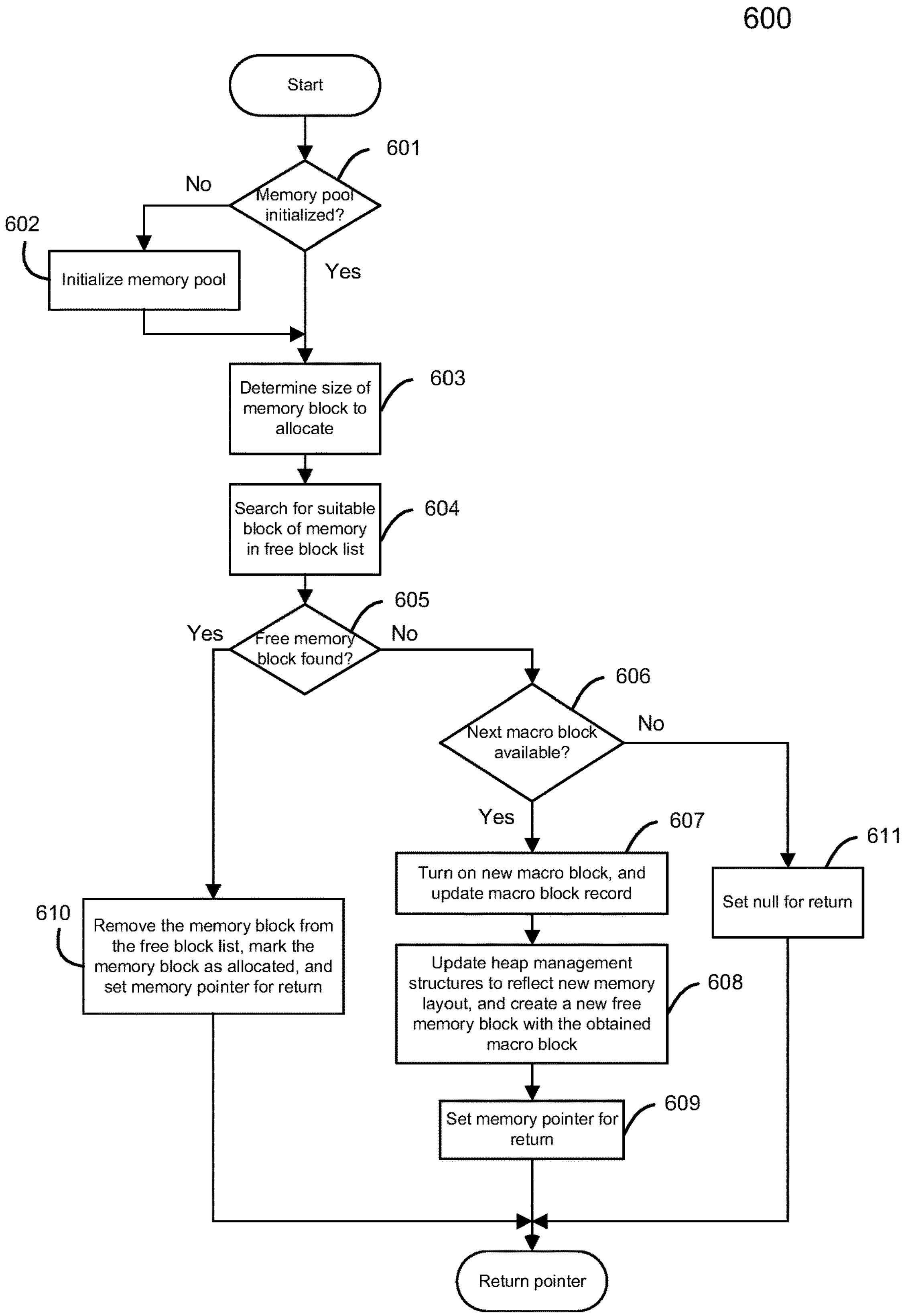
FIG. 6 is a flow diagram illustrating a process for memory allocation according to another embodiment.

FIG. 6 is a flow diagram of a process of memory allocation according to another embodiment. Process 600 may be performed by processing logic which may include software, hardware, or a combination thereof. For example, process 600 may be performed by processor(s) 201 of FIG. 2.

Referring to FIG. 6, at block 601, it is determined whether a memory pool is initialized. A memory pool may be a collection of one or more memory blocks having the same size. The memory pool may be used for memory management that allows dynamic memory allocation. If it is determined that the memory pool is not initialized, process 600 proceeds to block 602 where the memory pool is initialized with an initial amount of memory. Otherwise, if it is determined that the memory pool has been initialized, process 600 proceeds to block 603.

At block 603, a size of memory block to allocate is determined. The memory block, for example, may be allocated within the memory pool and it may be variable or fixed in size. At block 604, a suitable block of memory is searched in a free block list. The suitable memory block may be a free memory block within existing powered-on macro block(s), which may be completely unoccupied or partially occupied with data, that can accommodate the determined allocation size of memory block. At block 605, it is determined whether a free memory block is found. If a free memory block is found, process 600 proceeds to block 610. Otherwise, if a free memory block is not found, process 600 proceeds to block 606.

At block 610, the free memory block may be removed from the free block list, marked as allocated, and set memory pointer (e.g., heap current pointer) for return. At block 606, it is determined whether a next macro block in the memory device (e.g., RAM) is available. If so, process 600 proceeds to block 607. Otherwise, if a next macro block is unavailable, process 600 proceeds to block 611 where a null value is set for return.

At block 607, the available macro block may be powered on and a macro block record may be updated indicating that the macro block has been powered on and allocated (or occupied). At block 608, heap management structures may be updated to reflect the new memory layout, for example, to indicate that the memory in the newly occupied macro block has been allocated. The heap management structures may serve to keep track of which memory blocks in the heap are free (available for use), which memory blocks are currently in use (occupied) by the program, and the size of those blocks. In addition, a portion or all of a new free memory block may be created with the obtained macro block, depending whether the memory block can fit within the macro block. At block 609, a memory pointer (e.g., heap current pointer) may be set for return.

Figure 7:
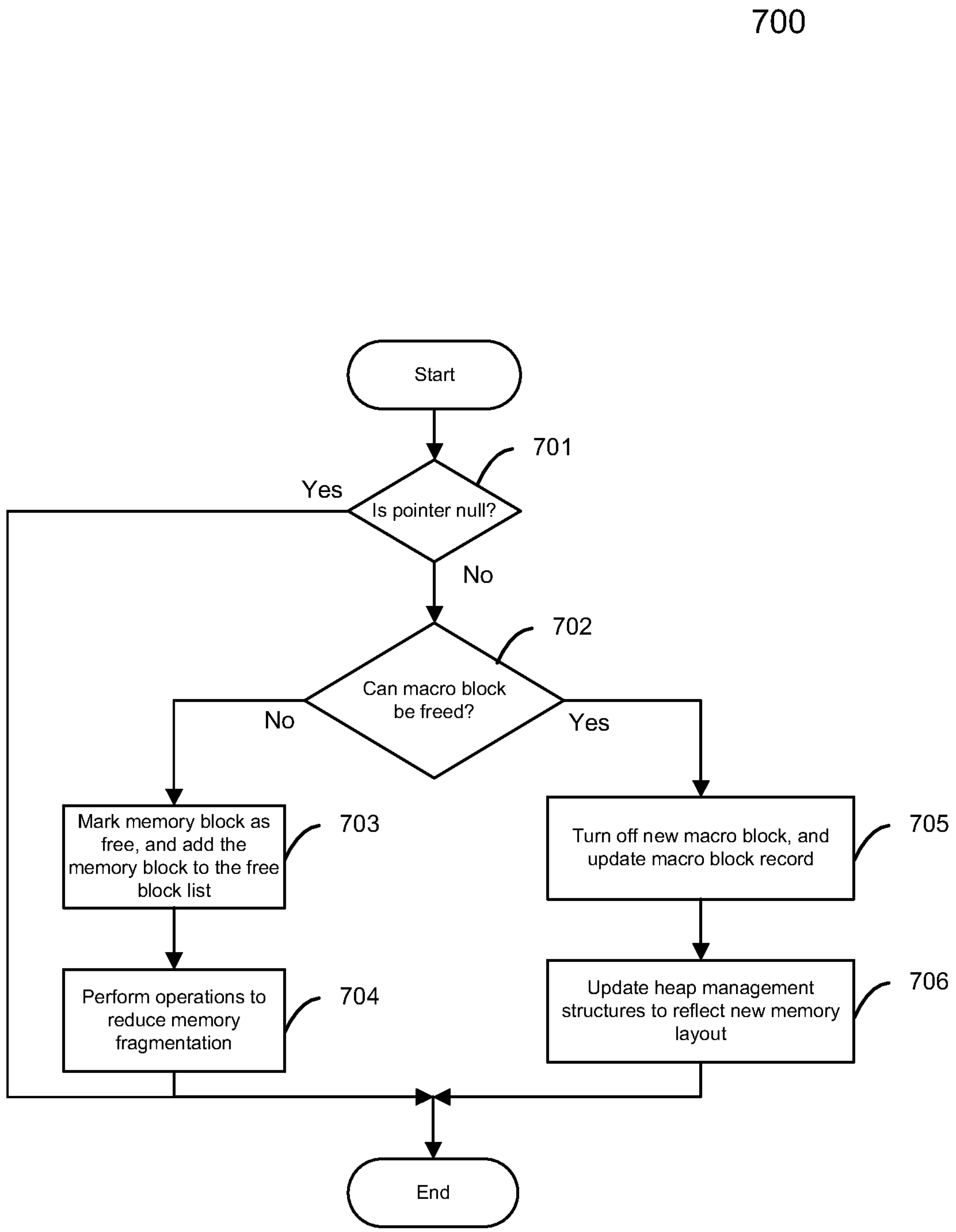
FIG. 7 is a flow diagram illustrating a process for freeing memory according to another embodiment.

FIG. 7 is a flow diagram of a process of memory freeing according to another embodiment. Process 700 may be performed by processing logic which may include software, hardware, or a combination thereof. For example, process 600 may be performed by processor(s) 201 of FIG. 2.

At block 701, it is determined whether a heap current pointer is null or points to an invalid block. If it is determined that the heap pointer is null or points to an invalid block, process 700 ends. Otherwise, if the heap current pointer is not null, process 700 proceeds to block 702. At block 702, it is determined whether a macro block can be freed. The macro block, for example, can be freed if there is no data occupying it or the heap current pointer does not point to any portion of that macro block. If the macro block can be freed, process 700 proceeds to block 705. Otherwise, process 700 proceeds to block 703. At block 703, a memory block may be marked as free and added to a free block list.

The memory block may be previously allocated in the macro block. At block 704, operations to reduce memory fragmentation may be performed, for example, using a memory defragmenter. At block 705, the macro block may be powered or turned off and a macro block record may be updated to indicate the macro block has been freed. At block 706, heap management structures are updated to reflect the new memory layout, for example, to exclude the previously allocated memory in the macro block.

In the foregoing specification, embodiments of the disclosure have been described with reference to specific example embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of memory allocation, comprising:

determining an allocation size of memory to allocate;

searching for a first memory block based on the allocation size, wherein the first memory block is a free memory block within one or more powered-on macro blocks that are partially occupied with data and can accommodate the determined allocation size;

in response to determining that the first memory block is not found, searching for a first macro block in a memory device, wherein the first macro block is an available macro block; and in response to determining that the first macro block is found, powering on the first macro block, creating a first portion or an entirety of a new free memory block within the first macro block, marking the first macro block as occupied, and updating a macro block record indicating that the first macro block is powered on and occupied.

2. The method of claim 1, further comprising: setting a memory pointer for return based on the allocation size.

3. The method of claim 2, wherein the memory pointer is a heap current pointer.

4. The method of claim 1, further comprising:

updating at least one heap management structure to indicate the first memory block has been allocated; and creating a portion or all of the first memory block in the first macro block.

5. The method of claim 1, further comprising: initializing a memory pool with an initial amount of memory.

6. The method of claim 1, further comprising:

searching for a second macro block in the memory device, wherein the second macro block is an available macro block; and when the second macro block is found, powering on the second macro block, creating a second portion of the new free memory block within the second macro block, marking the second macro block as occupied, and updating the macro block record indicating that the second macro block is powered on and occupied.

7. The method of claim 1, wherein the memory device is a random access memory (RAM).

8. An embedded device, comprising:

a memory; and one or more processors coupled to the memory to store instructions, which when executed by the one or more processors, cause the one or more processors to perform operations, the operations comprising:

determining an allocation size of memory to allocate;

searching for a first memory block based on the allocation size, wherein the first memory block is a free memory block within one or more powered-on macro blocks that are partially occupied with data and can accommodate the determined allocation size;

in response to determining that the first memory block is not found, searching for a first macro block in a memory device, wherein the first macro block is an available macro block; and in response to determining that the first macro block is found, powering on the first macro block, creating a first portion or an entirety of a new free memory block within the first macro block, marking the first macro block as occupied, and updating a macro block record indicating that the first macro block is powered on and occupied.

9. The embedded device of claim 8, wherein the operations further comprise: setting a memory pointer for return based on the allocation size.

10. The embedded device of claim 9, wherein the memory pointer is a heap current pointer.

11. The embedded device of claim 8, wherein the operations further comprise:

updating at least one heap management structure to indicate the first memory block has been allocated; and creating a portion or all of the first memory block in the first macro block.

12. The embedded device of claim 8, wherein the operations further comprise: initializing a memory pool with an initial amount of memory.

13. The embedded device of claim 8, wherein the operations further comprise:

searching for a second macro block in the memory device, wherein the second macro block is an available macro block; and when the second macro block is found, powering on the second macro block, creating a second portion of the new free memory block within the second macro block, marking the second macro block as occupied, and updating the macro block record indicating that the second macro block is powered on and occupied.

14. The embedded device of claim 8, wherein the memory device is a random access memory (RAM).

* * * * *